Sept. 12, 1961 M. A. DUDASH 2,999,708
BALL AND SOCKET JOINT
Filed Oct. 11, 1957
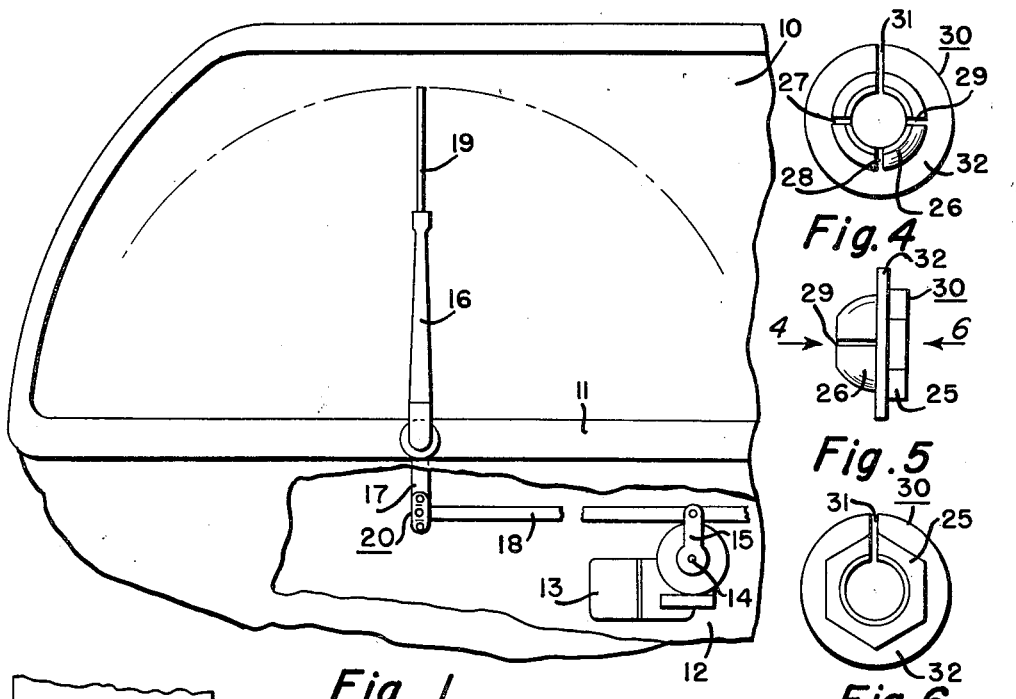
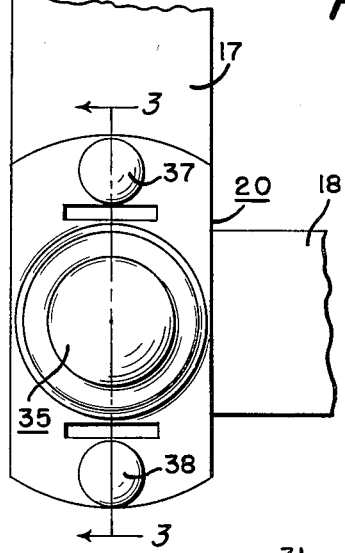
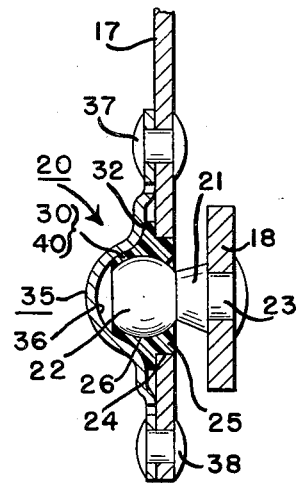
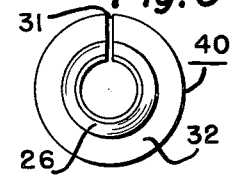
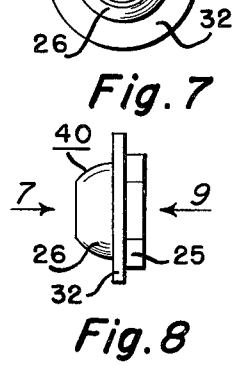
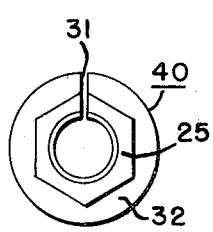
INVENTOR.
Michael A. Dudash
BY
*G. H. Strickland*
His Attorney United States Patent Office 2,999,708
Patented Sept. 12, 1961

2,999,708
BALL AND SOCKET JOINT
Michael A. Dudash, Rochester, N.Y., assignor to General Motors Corporation, Detroit, Mich., a corporation of Delaware
Filed Oct. 11, 1957, Ser. No. 689,575
3 Claims. (Cl. 287—87)

This invention pertains to ball and socket joints, and particularly to a ball and socket joint having a self-lubricating liner.

It is well recognized that a joint permitting limited universal movement is required between the connecting elements of a windshield wiper drive, since the location of the pivot shafts and the wiper motor in a vehicle cannot be accurately controlled. Heretofore, it has been proposed to utilize ball and socket joints between the ends of the connecting rods and the crank arms attached to the pivot shafts to allow limited universal movement and thereby compensate for the manufacturing tolerances. However, in the past the ball and socket joints included liners which required external lubrication, such as by means of a lubricant impregnated felt washer. The present invention relates to an improved ball and socket joint including a self-lubricating liner. Accordingly, among my objects are the provision of a ball and socket joint including a self-lubricating liner; the further provision of a socket construction including a retainer, a liner and a base member; the further provision of a self-lubricating plastic liner designed to be molded and readily removed from a spherical core; and the still further provision of a plastic liner having a plurality of slots in the socket portion and a single slot extending axially throughout the length of the liner thereby permitting ready assembly of a ball stud within the liner.

The aforementioned and other objects are accomplished in the present invention by utilizing a self-lubricating plastic, such as a linear polyamide, for the liner. Specifically, the liner comprises an integrally molded plastic element having a partially spherical socket portion with a polygonal flange and a locating shoulder. In one embodiment the partially spherical portion of the liner has a single slot therethrough while in a second embodiment the liner is molded over a spherical core with four slots through the hemispherical portion thereof, the slots being angularly spaced 90° apart. In addition, one of the slots extends axially throughout the length of the liner thereby splitting the liner. The slots enable the liner to be readily removed from the spherical core after molding, and in addition facilitate the ready assembly and disassembly with the ball end of the stud.

The socket portion of the liner is adapted to be mounted in a retainer having a partially spherical recess. Initially, the polygonal flange of the liner is inserted through a complementary polygonal aperture in a support member, with one side of the shoulder engaging the support member. Thereafter, the retainer is placed over the socket portion of the liner and riveted, or otherwise suitably connected to the support member thereby confining the liner within the assembly. By virtue of the polygonal shaped flange and complementary aperture in the support member, the liner is restrained against rotation relative to the support member and the retainer. Of course, the ball stud is inserted into the liner prior to attaching the retainer to the support member.

Further objects and advantages of the present invention will be apparent from the following description, reference being had to the accompanying drawing, wherein preferred embodiments of the present invention are clearly shown.

In the drawing:

FIGURE 1 is a fragmentary view of a vehicle having a windshield wiper drive with the ball and socket joint of this invention.

FIGURE 2 is a view in elevation of a ball and socket joint constructed according to this invention.

FIGURE 3 is a sectional view taken along line 3—3 of FIGURE 2.

FIGURE 4 is a front end view, in elevation, of the novel liner taken in the direction of arrow 4 of FIGURE 5.

FIGURE 5 is a side elevational view of the liner.

FIGURE 6 is an elevational view of the liner taken in the direction of arrow 6 of FIGURE 5.

FIGURE 7 is a front view of a modified liner taken in the direction of arrow 7 of FIGURE 8.

FIGURE 8 is a side view of the modified liner.

FIGURE 9 is an elevational view taken in the direction of arrow 9 of FIGURE 8.

With particular reference to FIGURE 1, a portion of a vehicle is shown having a windshield 10, a lower rail 11 and a firewall 12. An electric motor 13 is attached to the firewall, the motor having a rotary output shaft 14 to which a single crank 15 is connected. The vehicle includes a cleaner assembly for each side of the windshield, each cleaner assembly comprising a wiper arm 16 carrying a wiper blade 19 adapted for movement across the outer surface of the windshield 10. The wiper arm is drivingly connected to a pivot shaft, not shown, having a crank arm 17 attached thereto. The crank 15 and the crank arm 17 are interconnected by a connecting link 18, the inner end of which is movably connected to the crank arm 15 and the outer end of which is connected through a ball and socket joint 20, constructed according to this invention, to the crank arm 17.

With particular reference to FIGURES 2 and 3, the ball and socket joint 20 comprises a stud 21 having a ball end 22 and a projecting shank 23 which is suitably connected to the outer end of the link 18, such as by hot upsetting. The crank arm, or support member, 17 is formed with a polygonal aperture 24 adapted to snugly receive a polygonal flange 25 of a liner 30.

With reference to FIGURES 4 through 6, the liner 30 is composed of any suitable self-lubricating plastic such as a linear polyamide. The liner 30 is molded over a spherical core, and thus includes a partially spherical socket portion having slots 27, 28, 29 and 31 extending radially therethrough. In addition, the slot 31 extends axially throughout the length of the liner thereby splitting the liner. In addition, the liner 30 is formed with a locating shoulder 32 between the flange 25 and the socket portion 26.

Referring again to FIGURE 3, the liner 30 is disposed between the support member 17 and the metallic retainer 35 having a partially spherical recss 36. The retainer is rigidly connected to the support member 17 by a pair of rivets 37 and 38, with the shoulder 32 disposed between the retainer 35 and the support member 17. By virtue of the complementary polygonal flange 25 and the aperture 24, the liner 30 is retained in nonrotative relationship relative to both the retainer 35 and the support member 17.

In the modified embodiment of the liner as shown in FIGURES 7-9, similar reference numerals denote similar parts as aforedescribed. Thus, the modified liner 40, which is of greater strength, comprises a partially spherical portion 26, a locating shoulder 32, and a polygonal flange 25, having a single slot 31 therethrough.

In assembling a ball and socket joint, the shank portion of the ball is inserted through the aperture in the connecting link and riveted. Thereafter, the ball end 22 is inserted through aperture 24 in the support member 17. The liner 30 is snapped over the ball so that shoulder 32 engages the support member 17 and the polygonal flange is disposed in aperture 24. Finally, the retainer 35 is attached by rivets 37, 38.

While the embodiments of the invention as herein disclosed constitute preferred forms, it is to be understood that other forms might be adopted.

What is claimed is as follows:

1. A ball and socket joint including, a stud having a ball end and a shank projecting therefrom, a retainer having a partially spherical recess, a bearing liner mounted within the retainer and formed to define a ball socket portion for the ball end of the stud, said liner comprising an integral element having a single slot extending axially therethrough and a plurality of spaced slots in the socket portion, said liner also having a polygonal flange, and a member attached to said retainer having a complementary aperture receiving said polygonal flange whereby the liner is retained in nonrotative relationship between the retainer and the member.

2. A liner for a ball and socket joint including, a one-piece molded plastic element having a partially spherical socket portion and a polygonal mounting flange, said element having a single slot extending axially therethrough and a plurality of spaced slots in the socket portion.

3. A liner for a ball and socket joint including, a molded element having a partially spherical socket portion, a polygonal mounting flange and a locating shoulder, said element having a single slot extending axially therethrough and a plurality of spaced slots in the socket portion.

References Cited in the file of this patent

UNITED STATES PATENTS

| | | |
|---|---|---|
| 1,976,258 | Hollingsworth | Oct. 9, 1934 |
| 2,100,642 | Geyer | Nov. 30, 1937 |
| 2,167,962 | Louis | Aug. 1, 1939 |
| 2,305,815 | Schwarz | Dec. 22, 1942 |
| 2,461,866 | Alldredge | Feb. 15, 1949 |
| 2,791,454 | Saives | May 7, 1957 |
| 2,821,730 | Shellman | Feb. 4, 1958 |

FOREIGN PATENTS

| | | |
|---|---|---|
| 725,724 | Great Britain | Mar. 9, 1953 |